(12) United States Patent
Wang et al.

(10) Patent No.: US 11,963,199 B2
(45) Date of Patent: Apr. 16, 2024

(54) SEMI-PERSISTENT SCHEDULING METHOD AND APPARATUS FOR MBS SERVICE, AND TERMINAL DEVICE AND NETWORK DEVICE

(71) Applicant: GUANGDONG OPPO MOBILE TELECOMMUNICATIONS CORP., LTD., Dongguan (CN)

(72) Inventors: Shukun Wang, Dongguan (CN); Shichang Zhang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 18/206,724

(22) Filed: Jun. 7, 2023

(65) Prior Publication Data

US 2023/0319854 A1    Oct. 5, 2023

Related U.S. Application Data

(63) Continuation of application No. PCT/CN2020/135920, filed on Dec. 11, 2020.

(51) Int. Cl.
*H04W 72/30* (2023.01)
*H04W 72/11* (2023.01)
*H04W 72/21* (2023.01)

(52) U.S. Cl.
CPC ............ *H04W 72/30* (2023.01); *H04W 72/11* (2023.01); *H04W 72/21* (2023.01)

(58) Field of Classification Search
CPC ...... H04W 72/30; H04W 72/21; H04W 72/11
See application file for complete search history.

(56) References Cited

U.S. PATENT DOCUMENTS

| | | | |
|---|---|---|---|
| 2017/0311290 A1* | 10/2017 | Adjakple | H04W 76/18 |
| 2018/0048994 A1* | 2/2018 | Kwon | H04W 4/021 |
| 2018/0049225 A1* | 2/2018 | Lee | H04W 72/1263 |
| 2018/0270812 A1* | 9/2018 | Lee | H04W 76/10 |
| 2018/0359735 A1* | 12/2018 | Lee | H04W 72/23 |
| 2020/0329489 A1* | 10/2020 | Li | H04W 76/27 |
| 2021/0168882 A1* | 6/2021 | Chang | H04W 76/34 |

(Continued)

FOREIGN PATENT DOCUMENTS

| | | |
|---|---|---|
| CN | 101771939 A | 7/2010 |
| WO | 2018174664 A1 | 9/2018 |

(Continued)

OTHER PUBLICATIONS

Vivo, "Other issues for Rel-17 MBS", R1-2007694, 3GPP TSG RAN WG1 #103-e e-Meeting, Oct. 26-Nov. 13, 2020.

(Continued)

*Primary Examiner* — Brian D Nguyen
(74) *Attorney, Agent, or Firm* — BAYES PLLC

(57) ABSTRACT

Provided is a semi-persistent scheduling (SPS) method and apparatus for an MBS service, and a terminal device and a network device. The method comprises: a terminal device receiving first configuration information sent by a network device, wherein the first configuration information is used for determining N SPS configurations, N is a positive integer, and all or some of the N SPS configurations are used for transmitting an MBS service.

14 Claims, 6 Drawing Sheets

A network device sends first configuration information to a terminal device, and the terminal device receives the first configuration information sent by the network device, where the first configuration information is used for determining N semi-persistent scheduling (SPS) configurations, N is a positive integer, and all or some of the N SPS configurations are used for transmitting an MBS service.

(56) References Cited

U.S. PATENT DOCUMENTS

2023/0041764 A1\* 2/2023 Park .................. H04L 5/0053
2023/0155744 A1\* 5/2023 Bae ................... H04L 1/1887
370/280

FOREIGN PATENT DOCUMENTS

WO 2021231835 A1 11/2021
WO 2022109249 A1 5/2022

OTHER PUBLICATIONS

CATT, "Discussion on group scheduling mechanism for RRC_Connected UEs in MBS", R1-2007835, 3GPP TSG RAN WG1 Meeting #103-e e-Meeting, Oct. 26-Nov. 13, 2020.
Vivo, "Other issues for Rel-17 MBS", R1-2006658, 3GPP TSG RAN WG1 #102-e e-Meeting, Aug. 17-28, 2020.
International Search Report issued in international application No. PCT/CN2020/135920, dated Aug. 30, 2021.
Written Opinion of the International Searching Authority issued in international application No. PCT/CN2020/135920, dated Aug. 30, 2021.
RAN1 Chairman's Notes, 3GPP TSG RAN WG1 Meeting #103-e e-Meeting, Oct. 26-Nov. 13, 2020.
Extended European Search Report issued in corresponding European application No. 20964773.4, mailed Nov. 2, 2023.
Source: ZTE; Title: Mechanisms to Support Group Scheduling for RRC_CONNECTED UEs 3GPP TSG RAN WG1 Meeting #103-e R1-2008826 e-Meeting, Oct. 26-Nov. 13, 2020.

\* cited by examiner

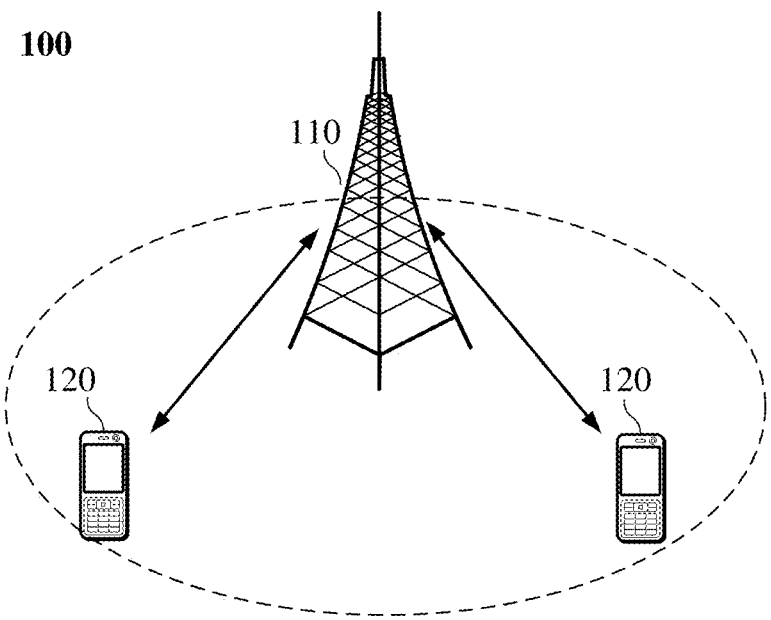

FIG. 1

A network device sends first configuration information to a terminal device, and the terminal device receives the first configuration information sent by the network device, where the first configuration information is used for determining N semi-persistent scheduling (SPS) configurations, N is a positive integer, and all or some of the N SPS configurations are used for transmitting an MBS service.

SEMI-PERSISTENT SCHEDULING METHOD AND APPARATUS FOR MBS SERVICE, AND TERMINAL DEVICE AND NETWORK DEVICE

CROSS-REFERENCE TO RELATED APPLICATION

This application is a continuation of International Application No. PCT/CN2020/135920 filed on Dec. 11, 2020, which is hereby incorporated by reference in its entirety.

TECHNICAL FIELD

Embodiments of the present disclosure relate to the technical field of mobile communication, and in particular to a semi-persistent scheduling method and apparatus for a Multicast Broadcast Service (MBS) service, a terminal device, and a network device.

BACKGROUND

In a New Radio (NR) system, terminal devices need to receive MBS services under the Radio Resource Control (RRC) connected state, and higher demands for the reliability of MBS services have been proposed. How to use Semi-Persistent Scheduling (SPS) to transmit MBS services and improve the reliability of MBS services transmission is a problem that needs to be clarified.

SUMMARY

Embodiments of the present disclosure provide a semi-persistent scheduling method and apparatus for a MBS service, a terminal device, and a network device.

The semi-persistent scheduling method for the MBS service provided by embodiments of the present disclosure includes:
  receiving, by a terminal device, first configuration information sent by a network device, where the first configuration information is used for determining N semi-persistent scheduling (SPS) configurations, N is a positive integer, and some or all of the N SPS configurations is used for transmitting the MBS service.

The semi-persistent scheduling method for the MBS service provided by embodiments of the present disclosure includes:
  sending, by a network device, first configuration information to a terminal device, where the first configuration information is used for determining N SPS configurations, N is a positive integer, and some or all of the N SPS configurations is used for transmitting the MBS service.

The semi-persistent scheduling apparatus for the MBS service provided by embodiments of the present disclosure is applied to a terminal device, and includes:
  a receiving unit, configured to receive first configuration information sent by a network device, where the first configuration information is used for determining N SPS configurations, N is a positive integer, and some or all of the N SPS configurations is used for transmitting the MBS service.

The semi-persistent scheduling apparatus for the MBS service provided by embodiments of the present disclosure is applied to a network device, and includes:
  a sending unit, configured to send first configuration information to a terminal device, where the first configuration information is used for determining N SPS configurations, N is a positive integer, and some or all of the N SPS configurations is used for transmitting the MBS service.

The terminal device provided by embodiments of the present disclosure includes a processor and a memory. The memory is configured to store a computer program, and the processor is configured to call and run the computer program stored in the memory to perform the above-mentioned semi-persistent scheduling method for the MBS service.

The network device provided by embodiments of the present disclosure includes a processor and a memory. The memory is configured to store a computer program, and the processor is configured to call and run the computer program stored in the memory to perform the above-mentioned semi-persistent scheduling method for the MBS service.

The chip provided by embodiments of the present disclosure is used for implementing the above-mentioned semi-persistent scheduling method for the MBS service.

Specifically, the chip includes: a processor, configured to call and run a computer program from a memory, so as to cause a device installed with the chip to perform the above-mentioned semi-persistent scheduling method for the MBS service.

The computer-readable storage medium provided by embodiments of the present disclosure is used for storing a computer program, and the computer program causes a computer to perform the above-mentioned semi-persistent scheduling method for the MBS service.

The computer program product provided by embodiments of the present disclosure includes computer program instructions, and the computer program instructions cause a computer to perform the above-mentioned semi-persistent scheduling method for the MBS service.

The computer program provided by embodiments of the present disclosure, when running on a computer, causes the computer to perform the above-mentioned semi-persistent scheduling method for the MBS service.

Through the above technical solutions, the network device configures the terminal device with one or more SPS configurations for transmitting MBS services, thereby achieving the use of frequency hopping and/or repeated transmission for MBS services and improving the transmission reliability of the MBS services.

BRIEF DESCRIPTION OF THE DRAWINGS

The accompanying drawings described herein are used to provide a further understanding of the present disclosure, and constitute a part of the present disclosure. The schematic embodiments of the present disclosure and their descriptions are used to explain the present disclosure, and do not constitute any improper limitation to the present disclosure. In the accompanying drawings:

FIG. 1 is a schematic diagram of a communication system architecture provided by embodiments of the present disclosure.

FIG. 2 is a schematic flowchart of a semi-persistent scheduling method for an MBS service provided by embodiments of the present disclosure.

DETAILED DESCRIPTION

Figure 3:
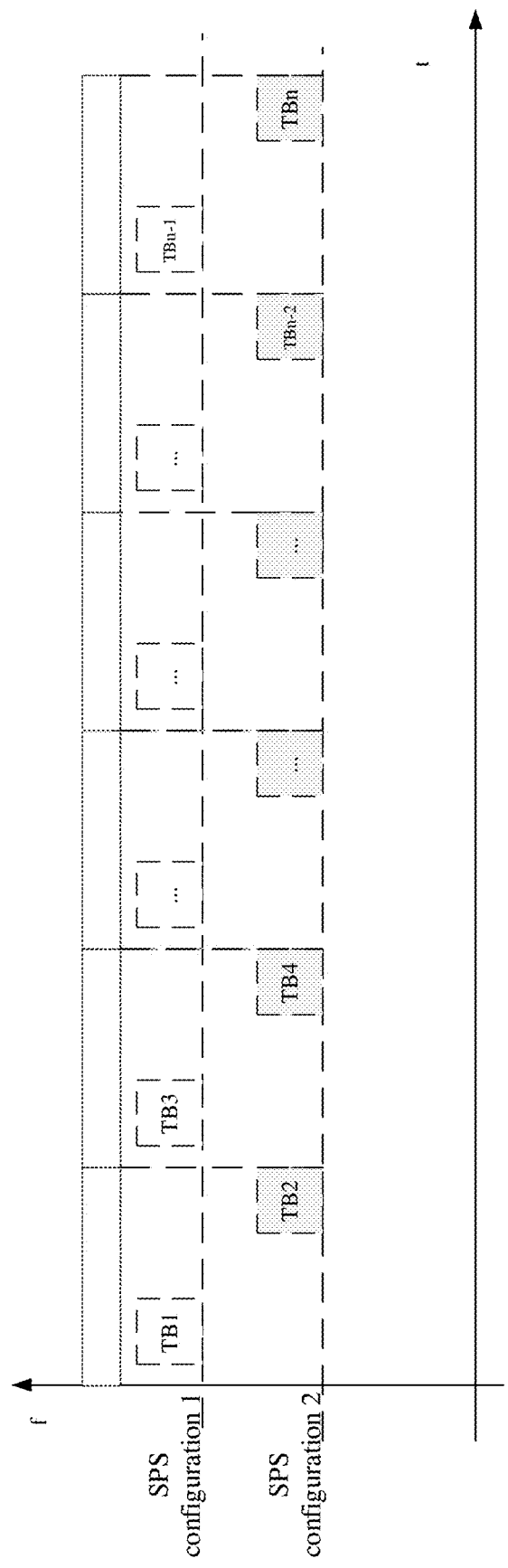
FIG. 3 is a first schematic diagram of TB transmission in the MBS service provided by embodiments of the present disclosure.

The technical solutions in embodiments of the present disclosure will be described below with reference to the accompanying drawings in embodiments of the present disclosure. Obviously, the described embodiments are part of the embodiments of the present disclosure, but not all of the embodiments. Based on the embodiments described in the present disclosure, all other embodiments obtained by those of ordinary skill in the art without creative efforts shall fall within the protection scope of the present disclosure.

The technical solutions in embodiments of the present disclosure may be applied to various communication systems, such as: Long Term Evolution (LTE) system, LTE Frequency Division Duplex (FDD) system, LTE Time Division Duplex (TDD) system, 5G communication system, or communication systems in the future, etc.

Exemplarily, the communication system 100 applied in embodiments of the present disclosure is shown in FIG. 1. The communication system 100 may include a network device 110, and the network device 110 may be a device that communicates with a terminal 120 (or referred to as a communication terminal, a terminal). The network device 110 may provide communication coverage over a specific geographic area, and may communicate with terminals located within the coverage area. Optionally, the network device 110 may be an evolutional base station (Evolutional Node B, eNB or eNodeB) in an LTE system, or a wireless controller in a Cloud Radio Access Network (CRAN). Alternatively, the network device may be a mobile switching center, a relay station, an access point, an in-vehicle device, a wearable device, a hub, a switch, a bridge, a router, a network-side device in a 5G network, or a network device in a future communication system.

The communication system 100 also includes at least one terminal 120 located within the coverage of the network device 110. A "terminal" as used herein includes, but is not limited to, a connection via a wired line, such as via Public Switched Telephone Networks (PSTN), Digital Subscriber Line (DSL), digital cable, direct cable connections; and/or another data connection/network; and/or via a wireless interface, e.g. for cellular network, Wireless Local Area Network (WLAN), digital television network such as DVB-H network, satellite network, AM-FM broadcast transmitter; and/or an apparatus of another terminal configured to receive/send a communication signal; and/or an Internet of Things (IoT) device. A terminal configured to communicate through a wireless interface may be referred to as a "wireless communication terminal", "wireless terminal", or "mobile terminal". Examples of the mobile terminal include, but are not limited to, a satellite or cellular telephone; a Personal Communications System (PCS) terminal that may combine cellular radio telephones with data processing, facsimile, and data communication capabilities; and a PDA that may include radio telephones, pagers, Internet/Intranet access, web browsers, memo pads, calendars, and/or Global Positioning System (GPS) receivers; and a conventional laptop and/or palmtop receivers or other electronic apparatus including radio telephone transceivers. A terminal may be an access terminal, a user equipment (UE), a subscriber unit, a subscriber station, a mobile station, a mobile, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with wireless communication function, a computing device or other processing devices connected to wireless modems, an in-vehicle device, a wearable device, a terminal in a 5G network, or a terminal in future evolved PLMNs, etc.

Optionally, direct Device to Device (D2D) communication may be performed between terminals 120.

Optionally, the 5G communication system or the 5G network may also be referred to as a New Radio (NR) system or an NR network.

FIG. 1 exemplarily shows one network device and two terminals. Optionally, the communication system 100 may include multiple network devices, and other numbers of terminals may be included in the coverage of each network device, which are not limited by embodiments of the present disclosure.

Optionally, the communication system 100 may further include other network entities such as a network controller and a mobility management entity, which are not limited by embodiments of the present disclosure.

It should be understood that, in embodiments of the present disclosure, a device having communication functions in the network/system may be referred to as a communication device. Taking the communication system 100 shown in FIG. 1 as an example, the communication device may include a network device 110 and a terminal 120 having communication functions, and the network device 110 and the terminal 120 may be the specific devices described above, which will not be repeated here. The communication device may further include other devices in the communication system 100, such as other network entities such as a network controller and a mobility management entity, which are not limited by embodiments of the present disclosure.

It should be understood that the terms "system" and "network" are often used interchangeably herein. The term "and/or" used herein is just an association relationship describing associated objects, which means that there may be three relationships. For example, A and/or B may indicate that A exists alone, A and B exist simultaneously, and B exists alone. In addition, the character "/" used herein generally indicates that the contextual objects are in an "or" relationship.

In order to facilitate the understanding of the technical solutions in embodiments of the present disclosure, the technical solutions related to embodiments of the present disclosure are described in the following.

With the pursuit of speed, latency, high-speed mobility, energy efficiency, and the diversity and complexity of services in future life, the $3^{rd}$ Generation Partnership Project (3GPP) international standards organization has started to develop 5G. The main application scenarios of 5G include enhanced Mobile Broadband (eMBB), Ultra-Reliable Low-Latency Communications (URLLC), and massive Machine-Type Communications (mMTC).

On the one hand, eMBB still aims at users' access to multimedia content, services and data, and its demand is growing rapidly. On the other hand, since eMBB may be deployed in different scenarios, such as indoor, urban, rural, etc., and its differences in capabilities and requirements are also significant, it cannot be generalized and must be analyzed in detail in conjunction with specific deployment scenarios. Typical applications of URLLC include: industrial automation, power automation, remote medical operations (surgery), traffic safety assurance, etc. Typical characteristics of mMTC include: high connection density, small data volume, latency-insensitive services, and low cost and long service life of the module.

In the early deployment of NR, it is difficult to obtain complete NR coverage, so the typical network coverage is a wide-area LTE coverage and an isolated NR coverage mode. In addition, a large amount of LTE is deployed below 6 GHz, and there is little spectrum below 6 GHz available for 5G. Therefore, NR must study the application of spectrum above 6 GHz, but the coverage in high frequency bands is limited and the signal fades quickly. At the same time, in order to protect the mobile operators' early investment in LTE, a tight interworking mode between LTE and NR has been proposed.

RRC Status

In order to reduce air interface signaling and quickly restore wireless connections and data services, 5G defines a new Radio Resource Control (RRC) state, namely the RRC_INACTIVE state. This state is different from the RRC_IDLE state and the RRC_ACTIVE state.

1) RRC_IDLE state (referred to as idle state): the mobility is based on UE's cell selection and reselection, the paging is initiated by the Core Network (CN), and the paging area is configured by the CN. There is no UE context at the base station side, and no RRC connection exists.

2) RRC_CONNECTED state (referred to as connected state): the RRC connection exists, and there is UE context at both the base station side and the UE side. The location of the UE known by the network side is at the specific cell level. The mobility is controlled by the network side. Unicast data can be transmitted between the UE and the base station.

3) RRC_INACTIVE state (referred to as inactive state): the mobility is based on UE's cell selection and reselection. There is a connection between CN and NR, and the UE context exists on a certain base station. The paging is triggered by the RAN, and the paging area based on the RAN is managed by the RAN. The location of the UE known by the network side is at the paging area level based on the RAN.

Multimedia Broadcast Multicast Service (MBMS)

MBMS is a technology that transmits data from a data source to multiple terminal devices by sharing network resources. This technology can effectively utilize network resources while providing multimedia services, and realize broadcast and multicast of multimedia services at higher rates (such as 256 kbps).

Due to the low spectral efficiency of MBMS, it is not enough to effectively carry and support the operation of mobile TV type services. Therefore, in LTE, 3GPP explicitly proposes to enhance the support capability for downlink high-speed MBMS services, and determines the design requirements for the physical layer and the air interface.

3GPP R9 introduced evolved MBMS (eMBMS) into LTE. eMBMS proposes the concept of Single Frequency Network (SFN), namely Multimedia Broadcast Multicast Service Single Frequency Network (MBSFN). MBSFN transmits service data in all cells simultaneously by using a unified frequency, but ensures synchronization between cells. This can greatly improve the overall signal-to-noise ratio distribution in the cell, and the spectrum efficiency will also be significantly improved accordingly. eMBMS implements broadcast and multicast of the service based on IP multicast protocol.

In LTE or enhanced LTE (LTE-Advanced, LTE-A), MBMS only has a broadcast bearer mode, and there is no multicast bearer mode. In addition, the reception of MBMS services is applicable to terminal devices in the idle or connected state.

The concept of Single Cell Point To Multipoint (SC-PTM) was introduced in 3GPP R13, and SC-PTM is based on the MBMS network architecture.

MBMS introduces new logical channels, including Single Cell-Multicast Control Channel (SC-MCCH) and Single Cell-Multicast Transport Channel (SC-MTCH). SC-MCCH and SC-MTCH are mapped to downlink shared channel (DL-SCH). Further, DL-SCH is mapped to Physical Downlink Shared Channel (PDSCH). SC-MCCH and SC-MTCH belong to logical channels. DL-SCH belongs to transmission channels, and PDSCH belongs to physical channels. SC-MCCH and SC-MTCH do not support Hybrid Automatic Repeat reQuest (HARQ) operations.

MBMS introduces a new System Information Block (SIB) type, namely SIB20. Specifically, the configuration information of SC-MCCH is transmitted through SIB20, and there is only one SC-MCCH in one cell. The configuration information of SC-MCCH includes: the modification period of SC-MCCH, the repetition period of SC-MCCH, and information such as the radio frame and subframe in which SC-MCCH is scheduled. Further, 1) the boundary of the modification period of SC-MCCH satisfies SFN mod m=0, where SFN represents the system frame number of the boundary, and m is the modification period of SC-MCCH configured in SIB20 (i.e., sc-mcch-ModificationPeriod). 2) The radio frame for scheduling SC-MCCH satisfies: SFN mod mcch-RepetitionPeriod=mcch-Offset, where SFN represents the system frame number of the radio frame, mcch-RepetitionPeriod represents the repetition period of SC-MCCH, and mcch-Offset represents the offset of SC-MCCH. 3) The subframe in which the SC-MCCH is scheduled is indicated by sc-mcch-Subframe.

SC-MCCH is scheduled through the Physical Downlink Control Channel (PDCCH). On the one hand, a new Radio Network Tempory Identity (RNTI), namely, a Single Cell RNTI (SC-RNTI), is introduced to identify the PDCCH (such as SC-MCCH PDCCH) used for scheduling SC-MCCH. Optionally, the fixed value of SC-RNTI is FFFC. On the other hand, a new RNTI, namely, a Single Cell Notification RNTI (SC-N-RNTI) is introduced to identify the PDCCH (such as the notification PDCCH) used for indicating the change notification of SC-MCCH. Optionally, the fixed value of SC-N-RNTI is FFFB. Further, one of the 8 bits in DCI 1C may be used for indicating the change notification. In LTE, the configuration information of SC-PTM is based on the SC-MCCH configured by the SIB20, then the SC-MCCH configures the SC-MTCH, and the SC-MTCH is used for transmitting service data.

Specifically, SC-MCCH only transmits one message (i.e., SCPTMConfiguration), which is used for configuring the configuration information of SC-PTM. The configuration information of SC-PTM includes: Temporary Mobile Group Identity (TMGI), session identifier (session id), Group RNTI (G-RNTI), Discontinuous Reception (DRX) configuration information, and the SC-PTM service information of neighboring cells, etc. It should be noted that the SC-PTM in R13 does not support the Robust Header Compression (ROHC) function.

The downlink discontinuous reception of SC-PTM is controlled by the following parameters: onDurationTimerSCPTM, drx-InactivityTimerSCPTM, SC-MTCH-SchedulingCycle, and SC-MTCH-SchedulingOffset.

When [(SFN*10)+subframe number] modulo (SC-MTCH-SchedulingCycle)=SC-MTCH-SchedulingOffset is satisfied, the timer onDurationTimerSCPTM is started.

When the downlink PDCCH scheduling is received, the timer drx-InactivityTimerSCPTM is started.

The downlink SC-PTM service is received only when the timer onDurationTimerSCPTM or drx-InactivityTimerSCPTM is running.

SC-PTM service continuity adopts the concept of MBMS service continuity based on SIB15, namely "SIB15+MBMSInterestIndication". The service continuity of terminal devices in the idle state is based on the concept of frequency priority.

It should be noted that the MBMS services in the above solutions include but are not limited to multicast services, groupcast services, and MBS services. Embodiments of the present disclosure are described by taking the MBS service as an example, and the description of "MBS service" may also be replaced by "multicast service" or "groupcast service" or "MBMS service".

In NR, the terminal device needs to receive the MBS service in the RRC connected state, which brings higher requirements for the reliability of the MBS service. How to use SPS to transmit MBS services and improve the reliability of MBS services transmission is a problem that needs to be clarified. Therefore, the following technical solutions in embodiments of the present disclosure are proposed.

In embodiments of the present disclosure, referring to Table 1 as shown below, the information of SPS configuration may include periodicity information, HARQ process (nrofHARQ-Processes, periodicityExt) information, PUCCH feedback resource (n1PUCCH-AN) information, MCS (mcs-Table) information, SPS configuration index (sps-ConfigIndex) information, HARQ process identification offset (harq-ProcID-Offset) information, HARQ feedback codebook (harq-CodebookID) information, PDSCH aggregation factor (pdsch-AggregationFactor) information, etc. In addition, the information of SPS configuration may also include other information as detailed in the following description in embodiments of the present disclosure.

TABLE 1

```
SPS-Config ::=                          SEQUENCE {
    periodicity                         ENUMERATED {ms10, ms20, ms32,
ms40, ms64, ms80, ms128, ms160, ms320, ms640,
                                                spare6,
spare5, spare4, spare3, spare2, spare1},
    nrofHARQ-Processes                  INTEGER (1..8),
    n1PUCCH-AN                          PUCCH-ResourceId
OPTIONAL,    -- Need M
    mcs-Table                           ENUMERATED {qam64LowSE}
OPTIONAL,    -- Need S
    ...,
    [[
    sps-ConfigIndex-r16                 SPS-ConfigIndex-r16
OPTIONAL,    -- Cond SPS-List
    harq-ProcID-Offset-r16              INTEGER  (0..15)
OPTIONAL,    -- Need R
    periodicityExt-r16                  INTEGER  (1..5120)
OPTIONAL,    -- Need R
    harq-CodebookID-r16                 INTEGER  (1..2)
OPTIONAL,    -- Need R
    pdsch-AggregationFactor-r16         ENUMERATED {n1, n2, n4, n8 }
OPTIONAL     -- Need S
    ]]
}
```

FIG. 2 is a schematic flowchart of a semi-persistent scheduling method for an MBS service provided by embodiments of the present disclosure. As shown in FIG. 2, the semi-persistent scheduling method for the MBS service includes the following steps:

Step 201: sending, by a network device, first configuration information to a terminal device, where the first configuration information is used for determining N SPS configurations, N is a positive integer, and some or all of the N SPS configurations is used for transmitting the MBS service.

In embodiments of the present disclosure, the network device may be a base station, such as a gNB.

(1) SPS Configuration of MBS Transmission

In embodiments of the present disclosure, the SPS configuration of MBS transmission may be implemented through first configuration information.

In an optional implementation, the first configuration information is carried in RRC signaling.

In an optional implementation, the first configuration information is carried in the BWP configuration or the serving cell configuration. Here, the BWP configuration is, for example, BWP-DownlinkDedicated configuration, and the serving cell configuration is, for example, ServingCellConfig.

It should be noted that, if the first configuration information is carried in the BWP configuration, it means that the network device configures the first configuration information per BWP. If the first configuration information is carried in the serving cell configuration, it means that the network device configures the first configuration information per cell.

In embodiments of the present disclosure, the first configuration information is used for determining N SPS configurations, N is a positive integer, and some or all of the N SPS configurations is used for transmitting the MBS service. Here, implementations of the first configuration information may be as follows.

The first implementation: the first configuration information includes a first SPS configuration list, the first SPS configuration list includes the N SPS configurations, and the first SPS configuration list is a dedicated SPS configuration list for transmitting the MBS service.

Further, optionally, each SPS configuration of the N SPS configurations includes second indication information, where the second indication information is used for indicating MBS identification information associated with the SPS configuration.

Here, since the first SPS configuration list is a dedicated SPS configuration list for transmitting the MBS service, all SPS configurations in the first SPS configuration list are used for transmitting the MBS service.

The second implementation: the first configuration information includes a first SPS configuration list, the first SPS configuration list includes the N SPS configurations, and each SPS configuration of the N SPS configurations includes first indication information, where the first indication information is used for indicating whether the SPS configuration is used for transmitting MBS service and/or MBS identification information associated with the SPS configuration.

Further, optionally, each SPS configuration of the N SPS configurations includes second indication information, where the second indication information is used for indicating MBS identification information associated with the SPS configuration.

In one example, the network device configures the SPS configuration information (i.e., the first configuration information) for transmitting the MBS service through RRC signaling, where the SPS configuration information may be implemented through the above-mentioned first implementation or second implementation.

In one example, corresponding to the first implementation above, the network device may configure a dedicated SPS configuration list (i.e., the first SPS configuration list) for transmitting MBS services in the BWP-DownlinkDedicated configuration or the ServingCellConfig configuration. The dedicated SPS configuration list includes N SPS configurations, where N is a positive integer. Optionally, the N SPS configurations are associated with MBS identification information, or each SPS configuration in the N SPS configurations is associated with MBS identification information (which may be implemented by including second indication information into the SPS configuration). The MBS identification information may identify the MBS service to be received, and the MBS identification information includes at least one of: TMGI, G-RNTI, or SPS G-RNTI.

In one example, corresponding to the above-mentioned second implementation, one SPS configuration list (i.e., the first SPS configuration list) is configured in the BWP-DownlinkDedicated configuration, and the SPS configuration list includes N SPS configurations, where N is a positive integer. Optionally, each SPS configuration in the SPS configuration list includes one indication information (i.e., the first indication information), and the indication information is used for indicating whether the SPS configuration is used for transmitting the MBS service. In other words, the indication information is used for indicating whether the SPS configuration is used for MBS reception purpose. Optionally, each SPS configuration in the N SPS configurations is associated with MBS identification information (which may be implemented by including second indication information into the SPS configuration). The MBS identification information may identify the MBS service to be received, and the MBS identification information includes at least one of: TMGI, G-RNTI, or SPS G-RNTI.

It should be noted that, since the SPS configuration is used for MBS service transmission, the SPS configuration may be referred to as "MBS SPS configuration".

(2) Activating and Deactivating SPS Configuration

In an embodiment of the present disclosure, the SPS configuration used for transmitting the MBS service is activated or deactivated through the DCI, and the DCI is hereinafter referred to as the first DCI, and the name of the DCI is not limited in embodiments of the present disclosure.

In embodiments of the present disclosure, the network device sends the first DCI to the terminal device, the terminal device receives the first DCI sent by the network device, and the first DCI is used for activating at least one SPS configuration of the N SPS configurations. Here, in the scenario of MBS service transmission, the activated SPS configuration is used for the MBS service transmission.

It should be noted that the first DCI may also be used for deactivating at least one SPS configuration of the N SPS configurations. In the scenario of MBS service transmission, the deactivated SPS configuration may no longer be used for the MBS service transmission.

In embodiments of the present disclosure, the first DCI is used for activating at least one SPS configuration. For this reason, some information needs to be carried in the first DCI, or in the MAC CE, or in the RRC signaling, for indicating the at least one SPS configuration. In an optional implementation, the first DCI or MAC CE or RRC signaling carries a first SPS identification list, and the first SPS identification list is used for determining at least one SPS configuration to be activated. In another optional implementation, the first DCI or MAC CE or RRC signaling carries a first MBS identifier, where the first MBS identifier is used for determining at least one SPS configuration to be activated.

In embodiments of the present disclosure, there are two scrambling modes for the first DCI, which are as follows:

The first scrambling mode: the first DCI is scrambled by the first Configured Scheduling Radio Network Temporary Identifier (CS-RNTI) configured by the RRC signaling. Here, the first CS-RNTI may be understood as an existing CS-RNTI.

Optionally, the first DCI carries third indication information, where the third indication information is used for indicating at least one of the following:

whether the activated SPS configuration is used for transmitting the MBS service; or MBS identification information associated with the activated SPS configuration.

The second scrambling mode: the first DCI is scrambled by the second CS-RNTI configured by the RRC signaling, and the second CS-RNTI is the CS-RNTI used by MBS SPS. Here, the second CS-RNTI may be understood as a CS-RNTI dedicated to MBS SPS.

Optionally, since the second CS-RNTI is the CS-RNTI used by MBS SPS, the second CS-RNTI is used for indicating that the activated SPS is used for transmitting the MBS service, and the second CS-RNTI is associated with MBS identification information.

Optionally, the first DCI carries fourth indication information, where the fourth indication information is used for indicating MBS identification information associated with the activated SPS configuration.

In one example, a DCI (i.e., the first DCI) is scrambled using a CS-RNTI configured by RRC signaling (i.e., the first CS-RNTI), and at least one SPS configuration is activated or deactivated through the DCI. Here, CS-RNTI may be configured per cell group or per UE. The DCI carries an SPS identification list (i.e., the first SPS identification list) or a MBS identification (i.e., the first MBS identification), and indicates the target SPS configuration to be activated through the SPS identification list or the MBS identification. Optionally, the DCI carries indication information (i.e., the third indication information), and the indication information is used for indicating whether the activated SPS configuration is used for transmitting the MBS service. In other words, the indication information is used for indicating whether the activated SPS configuration is used for MBS reception purpose. Optionally, the indication information is also used for indicating MBS identification information associated with the activated SPS configuration, the MBS identification information can identify the MBS service to be received, and the MBS identification information includes at least one of: TMGI, G-RNTI, or SPS G-RNTI.

In one example, a dedicated SPS configuration list (i.e. the first SPS configuration list) configured in the BWP-DownlinkDedicated configuration is used for transmitting the MBS service, a dedicated CS-RNTI configured through RRC signaling (i.e., the second CS-RNTI) scrambles a DCI (i.e., the first DCI), and at least one SPS configuration in the dedicated SPS configuration list is activated or deactivated through the DCI. Here, the dedicated CS-RNTI refers to the CS-RNTI used by the MBS SPS, which may be referred to as the MBS CS-RNTI, and the MBS CS-RNTI is associated with MBS identification information, such as TMGI, G-RNTI. The DCI carries an SPS identification list (i.e., the first SPS identification list) or an MBS identification (i.e., the first MBS identification), and indicates the target SPS configuration to be activated through the SPS identification list or the MBS identification. Optionally, the DCI carries indication information (i.e., the fourth indication information), and the indication information is used for indicating MBS identification information associated with the activated SPS configuration. The MBS identification information may identify the MBS service to be received, and the MBS identification information includes at least one of: TMGI, G-RNTI, or SPS G-RNTI.

(3) PUCCH Feedback Resource Configuration of MBS Service

In embodiments of the present disclosure, the network device sends second configuration information to the terminal device, and the terminal device receives the second configuration information sent by the network device, where the second configuration information is used for determining a configuration of a first PUCCH resource pool, and a PUCCH resource in the first PUCCH resource pool is used for transmitting feedback information of the MBS service; and/or the network device sends third configuration information to the terminal device, and the terminal device receives the third configuration information sent by the network device, where the third configuration information is used for determining a PUCCH resource of the terminal device, and the PUCCH resource is used for the feedback information of the MBS service transmitted by the terminal device.

In one optional implementation, the PUCCH resource is associated with one or more SPS configurations.

In one optional implementation, the PUCCH resource is associated with MBS identification information.

In the above solution, optionally, the second configuration information and the third configuration information may be configured through RRC signaling.

In one example, the network device configures the PUCCH resource pool for MBS service feedback through RRC signaling, and/or configures the PUCCH resource for MBS service feedback of each terminal device through RRC dedicated signaling. Here, the PUCCH resource is associated with one or more SPS configurations, or the PUCCH resource is associated with MBS identification information, such as TMGI, G-RNTI.

(4) Frequency Hopping Transmission and/or Repeated Transmission of MBS Services

The first DCI may activate one SPS configuration or a plurality of SPS configurations, and in the following, the case where one SPS configuration is activated and the case where a plurality of SPS configurations is of activated are described respectively.

A) The first DCI is used for activating one SPS configuration, and the one SPS configuration is used for transmitting a first MBS service. Here, the first MBS service may also be referred to as an SPS MBS service. That is, the first MBS service is an MBS service transmitted in a semi-persistent scheduling way.

In one optional implementation, the one SPS configuration is associated with MBS identification information of the first MBS service.

In one optional implementation, the first DCI includes first resource allocation information, and the first resource allocation information is used for determining one or more PDSCH resource allocations corresponding to the one SPS configuration.

In one optional implementation, the one SPS configuration is associated with fifth indication information, and the fifth indication information is used for indicating at least one of the following:

the frequency hopping mode adopted by the first MBS service;

the frequency hopping pattern adopted by the first MBS service;

the repeated transmission mode adopted by the first MBS service;

the number of transmission times of one service data in the first MBS service;

the number of PDSCH resource allocations associated with the one SPS configuration; or the number of repeated transmissions associated with the one SPS configuration.

In the above solution, the transmission times of one service data in the first MBS service may be determined through the PDSCH aggregation factor, i.e., the pdsch-AggregationFactor in Table 1 above. The PDSCH aggregation factor may also be referred to as a repetition factor of one service data, through which the number of transmission times of one service data can be determined.

In one example, for SPS MBS services with frequency hopping transmission and no repeated transmission, the fifth indication information is used for indicating at least one of the following: the frequency hopping mode adopted by the first MBS service, the frequency hopping pattern adopted by the first MBS service, or the number of PDSCH resource allocations associated with the one SPS configuration.

In one example, for SPS MBS services with frequency hopping and repeated transmission, the fifth indication information is used for indicating at least one of the following: the frequency hopping mode adopted by the first MBS service, the frequency hopping pattern adopted by the first MBS service, the repeated transmission mode adopted by the first MBS service, the number of PDSCH resource allocations associated with the one SPS configuration, the number of repeated transmissions associated with the one SPS configuration, or the number of transmission times of one service data in the first MBS service.

In one example, for SPS MBS services without frequency hopping and repeated transmission but with frequency hopping transmission of different service data, the fifth indication information is used for indicating at least one of the following: the frequency hopping mode adopted by the first MBS service, the frequency hopping pattern adopted by the first MBS service, the number of PDSCH resource allocations associated with the one SPS configuration, or the number of transmission times of one service data in the first MBS service.

B) the first DCI is used for activating a plurality of SPS configurations, and the plurality of SPS configurations are used for transmitting a first MBS service. Here, the first MBS service may also be referred to as an SPS MBS service. That is, the first MBS service is an MBS service transmitted in a semi-persistent scheduling way.

In one optional implementation, the plurality of SPS configurations are associated with MBS identification information of the first MBS service.

In one optional implementation, the plurality of SPS configurations are associated with a same HARQ feedback codebook.

In one optional implementation, the association relationship between the plurality of SPS configurations and the HARQ feedback codebook is configured by RRC signaling, and a PUCCH resource corresponding to the HARQ feedback codebook is also configured by the RRC signaling.

In one optional implementation, the first DCI includes second resource allocation information, and the second resource allocation information is used for determining one or more PDSCH resource allocations corresponding to each SPS configuration of the plurality of SPS configurations.

In one optional implementation, the plurality of SPS configurations or each SPS configuration of the plurality of SPS configurations is associated with sixth indication information, and the sixth indication information is used for indicating at least one of the following:
- the frequency hopping mode adopted by the first MBS service;
- the frequency hopping pattern adopted by the first MBS service;
- the number of PDSCH resource allocations associated with the SPS configuration;
- the number of repeated transmissions associated with the SPS configuration; or
- whether a transmission associated with the SPS configuration is an initial transmission or an M-th retransmission of one service data, where M is a positive integer.

In embodiments of the present disclosure, the first DCI includes a frequency hopping mode of MBS transmission and/or a frequency hopping pattern of MBS transmission, where the frequency hopping mode of MBS transmission includes frequency hopping transmission for retransmissions of the same service data, and frequency hopping transmission for different service data. The frequency hopping pattern of MBS transmission is a frequency hopping pattern represented in accordance with an SPS configuration index list, or indexes associated with each radio resource allocation in the first DCI are frequency-hopped in an ascending or descending order. It should be noted that, the frequency hopping mode and the frequency hopping pattern described in the above solutions in embodiments of the present disclosure may be understood with reference to the descriptions herein.

In one example, for SPS MBS services with frequency hopping transmission but no repeated transmission, the sixth indication information is used for indicating at least one of the following: the frequency hopping mode adopted by the first MBS service, or the frequency hopping pattern adopted by the first MB S service.

In one example, for SPS MBS services with frequency hopping and repeated transmission, the sixth indication information is used for indicating at least one of the following: the frequency hopping mode adopted by the first MBS service, the frequency hopping pattern adopted by the first MBS service, or whether a transmission associated with the SPS configuration is an initial transmission or an M-th retransmission of one service data, where M is a positive integer.

In one example, for SPS MBS services without frequency hopping and repeated transmission but with frequency hopping transmission of different service data, the sixth indication information is used for indicating at least one of the following: the frequency hopping mode adopted by the first MBS service, the frequency hopping pattern adopted by the first MBS service, the number of PDSCH resource allocations associated with one SPS configuration, or the number of transmission times of one service data in the first MBS service.

The above technical solutions are illustrated below in conjunction with specific application examples.

First Example

The network device configures the SPS configuration for MBS service transmission through RRC signaling.

1) The network device configures one SPS configuration for transmitting one MBS service. The SPS configuration is associated with the MBS identification information of one MBS service, such as TMGI or G-RNTI. The information of the SPS configuration may additionally include fifth indication information in addition to the information given in Table 1. Optionally, the fifth indication information is used for indicating at least one of the following: the frequency hopping mode adopted by the MBS service, the frequency hopping pattern adopted by the MBS service, or the number of PDSCH resource allocations associated with the one SPS configuration.

2) The network device configures a plurality of SPS configurations (hereinafter referred to as a group of SPS configurations) for transmitting one MBS service. The group of SPS configurations is associated with the MBS identification information of one MBS service, such as TMGI or G-RNTI. The group of SPS configurations is associated with sixth indication information, or each SPS configuration in the group of SPS configurations is associated with sixth indication information. Optionally, in addition to the information given in Table 1, the information of each SPS configuration in the group of SPS configurations may additionally include sixth indication information. Optionally, the sixth indication information is used for indicating at least one of the following: the frequency hopping mode adopted by the MBS service, or the frequency hopping pattern adopted by the MBS service.

Here, all SPS configurations corresponding to one MBS service correspond to one HARQ feedback codebook ID or HARQ feedback codebook. That is to say, this group of SPS configurations corresponds to one HARQ feedback codebook. The network device may configure the association relationship between the group of SPS configurations and the HARQ feedback codebook (or HARQ feedback codebook ID) through an RRC signaling, and a PHCCH resource corresponding to feedback of the HARQ feedback codebook is also configured by the RRC signaling.

In embodiments of the present disclosure, the terminal device receives the DCI for activating the SPS configuration. In one optional implementation, the DCI at least includes multiple time-frequency resource allocations corresponding to one SPS. In another optional implementation, the DCI at least includes time-frequency resource allocations corresponding to multiple SPS configurations. Optionally, the DCI also includes a frequency hopping mode adopted by the MBS service and/or a frequency hopping pattern adopted by the MBS service (i.e., the frequency hopping mode of MBS transmission and/or the frequency hopping pattern of MBS transmission). Here, the description of the frequency hopping mode and the frequency hopping pattern may be understood with reference to the above-mentioned related descriptions. The terminal device receives the MBS service according to the SPS configuration corresponding to the MBS service configured in the RRC signaling and the time-frequency resource allocation corresponding to activation of the SPS configuration. Here, the time-frequency resource allocation is the PDSCH resource allocation, i.e., the time-frequency resource allocation of PDSCH.

Referring to FIG. 3, the SPS configurations for transmitting the MBS service includes SPS configuration 1 and SPS configuration 2, and these two SPS configurations are activated by DCI. For the MBS service with frequency hopping transmission but no repeated transmission, there is no intra-frequency and inter-frequency repeated transmission for the service data of the MBS service, but inter-frequency frequency hopping exits for the service data of the MBS service. For example, the service data of the MBS service is transmitted in the order as shown in FIG. 3: TB1, TB2, TB3, TB4, . . . , where TB1 is transmitted on the PDSCH resource associated with SPS configuration 1, TB2 is transmitted on the PDSCH resource associated with SPS configuration 2, and frequency hopping transmission is performed like this.

It should be noted that one TB refers to one service data of the MBS service, which may also be referred to as MBS service data.

Second Example

The network device configures the SPS configuration for MBS transmission through RRC signaling.

1) The network device configures one SPS configuration for transmitting one MBS service. The SPS configuration is associated with the MBS identification information of one MBS service, such as TMGI or G-RNTI. The information of the SPS configuration may additionally include fifth indication information in addition to the information given in Table 1. Optionally, the fifth indication information is used for indicating at least one of the following: the repeated transmission mode adopted by the MBS service, the number of PDSCH resource allocations associated with the one SPS configuration, the number of repeated transmissions associated with the one SPS configuration, or the number of transmission times of one service data.

2) The network device configures a plurality of SPS configurations (hereinafter referred to as a group of SPS configurations) for transmitting one MBS service. The group of SPS configurations is associated with the MBS identification information of one MBS service, such as TMGI or G-RNTI. The group of SPS configurations is associated with sixth indication information, or each SPS configuration in the group of SPS configurations is associated with sixth indication information. Optionally, the network device configures through RRC signaling that each SPS configuration in the group of SPS configurations is associated with transmission indication information (i.e., the sixth indication information), and the transmission indication information is used for indicating whether the transmission associated with the SPS configuration is an initial transmission or an M-th retransmission of one service data (or a T-th transmission of the one service data).

Here, all SPS configurations corresponding to one MBS service correspond to one HARQ feedback codebook ID or HARQ feedback codebook. That is to say, this group of SPS configurations corresponds to one HARQ feedback codebook. The network device may configure the association relationship between the group of SPS configurations and the HARQ feedback codebook (or HARQ feedback codebook ID) through RRC signaling, and a PHCCH resource corresponding to feedback of the HARQ feedback codebook is also configured by the RRC signaling.

PUCCH resource configuration of one HARQ-ACK/ NACK is fed back for a plurality of SPSs.

In embodiments of the present disclosure, the terminal device receives the DCI for activating the SPS configuration. In one optional implementation, the DCI at least includes multiple time-frequency resource allocations corresponding to one SPS. In another optional implementation, the DCI at least includes time-frequency resource allocations corresponding to multiple SPS configurations. Optionally, the DCI also includes transmission indication information (i.e., the sixth indication information), and the transmission indication information is used for indicating whether the transmission associated with the SPS configuration is an initial transmission or an M-th retransmission of one service data (or a T-th transmission of the one service data). Optionally, the DCI further includes feedback indication information, and the feedback indication information is used for indicating whether HARQ feedback is required for the MBS service. The terminal device receives the MBS service according to the SPS configuration corresponding to the MBS service configured in the RRC signaling and the time-frequency resource allocation corresponding to activation of the SPS configuration. Here, the time-frequency resource allocation is the PDSCH resource allocation, i.e., the time-frequency resource allocation of PDSCH.

Figure 4:
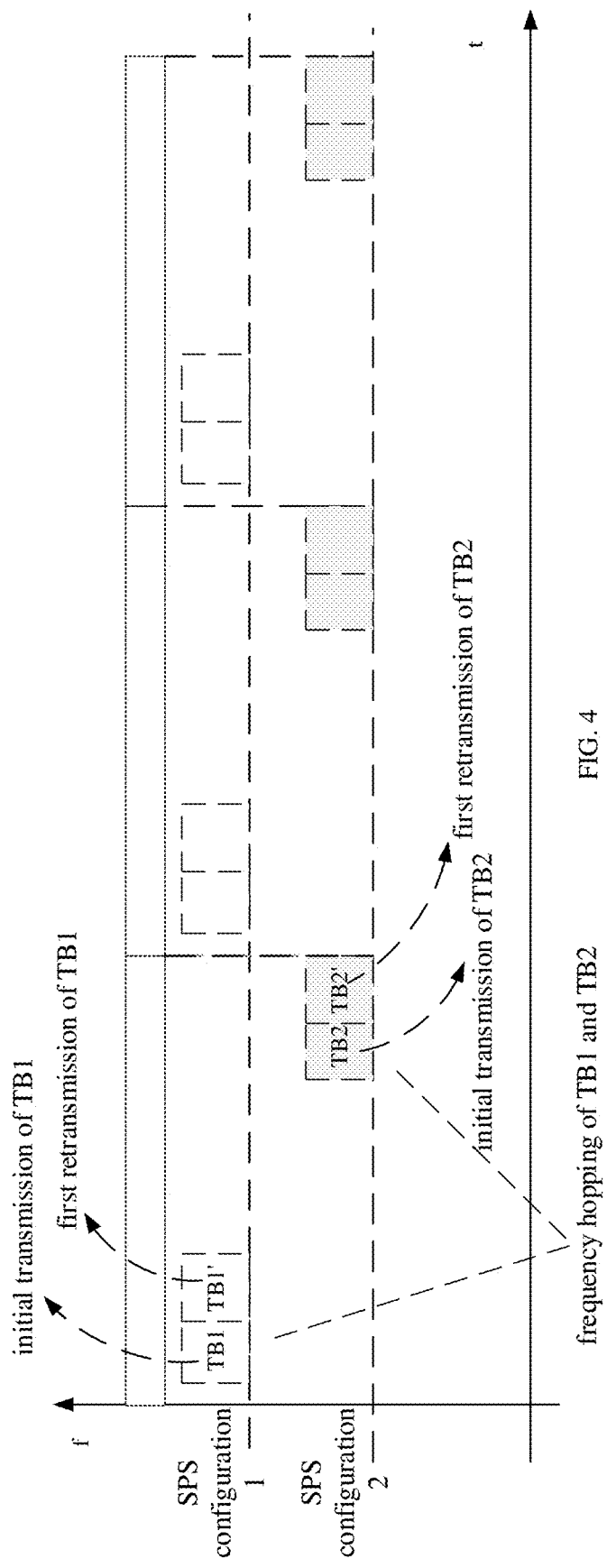
FIG. 4 is a second schematic diagram of TB transmission in the MBS service provided by embodiments of the present disclosure.

Referring to FIG. 4, the SPS configurations for transmitting the MBS service includes SPS configuration 1 and SPS configuration 2, and these two SPS configurations are activated by DCI. For the SPS MBS service with frequency hopping and repeated transmission, there is no intra-frequency repeated transmission for the service data of the MBS service, but inter-frequency repeated transmission exists. For example, the service data of the MBS service is transmitted in the order as shown in FIG. 4: TB1, TB1', TB2, TB2', . . . , where TB1 is transmitted on the PDSCH resource associated with SPS configuration 1, TB1' is transmitted on the PDSCH resource associated with SPS configuration 2, TB1' is the first retransmission of TB1, and frequency hopping repeated transmission is performed like this.

It should be noted that one TB refers to one service data of the MBS service, which may also be referred to as MBS service data.

Third Example

The network device configures the SPS configuration for MBS service transmission through RRC signaling.

1) The network device configures one SPS configuration for transmitting one MBS service. The SPS configuration is associated with the MBS identification information of one MBS service, such as TMGI or G-RNTI. The information of the SPS configuration may additionally include fifth indication information in addition to the information given in Table 1. Optionally, the fifth indication information is used for indicating at least one of the following: the frequency hopping mode adopted by the MBS service, the frequency hopping pattern adopted by the MBS service, the number of PDSCH resource allocations associated with the one SPS configuration, or the number of repeated transmissions associated with the SPS configuration.

2) The network device configures a plurality of SPS configurations (hereinafter referred to as a group of SPS configurations) for transmitting one MBS service. The group of SPS configurations is associated with the MBS identification information of one MBS service, such as TMGI or G-RNTI. The group of SPS configurations is associated with sixth indication information, or each SPS configuration in the group of SPS configurations is associated with sixth indication information. Optionally, in addition to the information given in Table 1, the information of each SPS configuration in the group of SPS configurations may additionally include sixth indication information. Optionally, the sixth indication information is used for indicating at least one of the following: the frequency hopping mode adopted by the MBS service, the frequency hopping pattern adopted by the MBS service, or the number of repeated transmissions associated with the SPS configuration.

Here, all SPS configurations corresponding to one MBS service correspond to one HARQ feedback codebook ID or HARQ feedback codebook. That is to say, this group of SPS configurations corresponds to one HARQ feedback codebook. The network device may configure the association relationship between the group of SPS configurations and the HARQ feedback codebook (or HARQ feedback codebook ID) through RRC signaling, and a PHCCH resource corresponding to feedback of the HARQ feedback codebook is also configured by the RRC signaling.

In embodiments of the present disclosure, the terminal device receives the DCI for activating the SPS configuration. In one optional implementation, the DCI at least includes multiple time-frequency resource allocations corresponding to one SPS. In another optional implementation, the DCI at least includes time-frequency resource allocations corresponding to multiple SPS configurations. Optionally, the DCI also includes a frequency hopping mode adopted by the MBS service and/or a frequency hopping pattern adopted by the MBS service (i.e., the frequency hopping mode of MBS transmission and/or the frequency hopping pattern of MBS transmission). Here, the description of the frequency hopping mode and the frequency hopping pattern may be understood with reference to the above-mentioned related descriptions. The terminal device receives the MBS service according to the SPS configuration corresponding to the MBS service configured in the RRC signaling and the time-frequency resource allocation corresponding to activation of the SPS configuration. Here, the time-frequency resource allocation is the PDSCH resource allocation, i.e., the time-frequency resource allocation of PDSCH.

Figure 5:
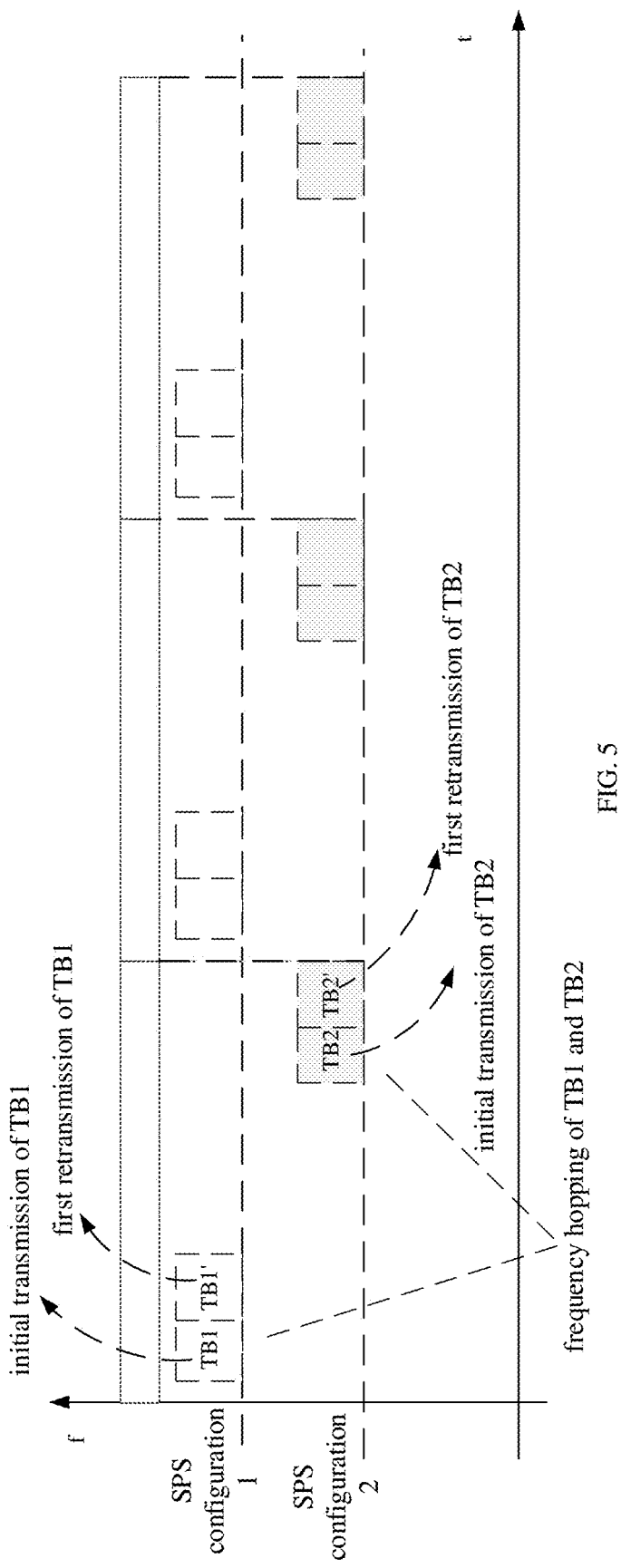
FIG. 5 is a third schematic diagram of TB transmission in the MBS service provided by embodiments of the present disclosure.

Referring to FIG. 5, the SPS configurations for transmitting the MBS service includes SPS configuration 1 and SPS configuration 2, and these two SPS configurations are activated by DCI. For the SPS MBS service without frequency hopping and repeated transmission but with frequency hopping transmission of different service data, there is intra-frequency repeated transmission for the service data of the MBS service, but no inter-frequency repeated transmission exits. For example, the service data of the MBS service is transmitted in the order as shown in FIG. 5: TB1, TB1', TB2, TB2', . . . , where the number of repeated transmissions associated with SPS configuration 1 is 2, TB1 and TB1' are transmitted on the PDSCH resource associated with SPS configuration 1, the number of repeated transmissions associated with SPS configuration 2 is 2, TB2 and TB2' are transmitted on the PDSCH resource associated with SPS configuration 2, and frequency hopping repeated transmission is performed like this.

It should be noted that one TB refers to one service data of the MBS service, which may also be referred to as MBS service data.

(5) Scrambling Mode of PDSCH of MBS Service

In embodiments of the present disclosure, the scrambling mode of the PDSCH scheduled by the first DCI is configured by RRC signaling or indicated by the first DCI.

In one optional implementation, the PDSCH scheduled by the first DCI is scrambled using CS-RNTI. In another optional implementation, the PDSCH scheduled by the first DCI is scrambled using G-RNTI.

In one example, CS-RNTI is used for scrambling the PDSCH, where the PDSCH refers to the PDSCH used for transmitting the SPS MBS service, and the SPS MBS service refers to the MBS service transmitted in a semi-persistent scheduling way (i.e., the MBS service transmitted based on the SPS configuration). The CS-RNTI associated with the SPS MBS service may be configured through RRC signaling.

In one example, G-RNTI is used for scrambling the PDSCH, where the PDSCH refers to the PDSCH used for transmitting the SPS MBS service, and the SPS MBS service refers to the MBS service transmitted in a semi-persistent scheduling way (i.e., the MBS service transmitted based on the SPS configuration). The G-RNTI associated with the CS-RNTI or the SPS MBS service may be configured through RRC signaling.

In one example, whether to use CS-RNTI to scramble the PDSCH or use G-RNTI to scramble the PDSCH is indicated by the DCI for activating the SPS configuration (i.e., the first DCI) or RRC signaling. Here, the PDSCH refers to the PDSCH used for transmitting the SPS MBS service, and the SPS MBS service refers to the MBS service transmitted in a semi-persistent scheduling way (i.e., the MBS service transmitted based on the SPS configuration).

Figure 6:
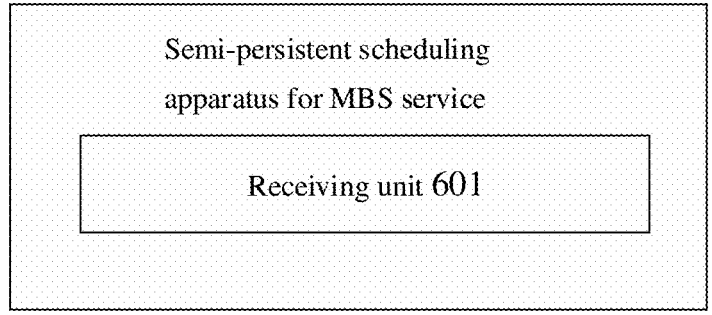
FIG. 6 is a first schematic diagram in structure and composition of the semi-persistent scheduling apparatus for the MBS service provided by embodiments of the present disclosure.

FIG. 6 is a first schematic diagram in structure and composition of the semi-persistent scheduling apparatus for the MBS service provided by embodiments of the present disclosure, which is applied to a terminal device. As shown in FIG. 6, the semi-persistent scheduling apparatus for the MBS service includes:

a receiving unit 601, configured to receive first configuration information sent by a network device, where the first configuration information is used for determining N SPS configurations, N is a positive integer, and some or all of the N SPS configurations is used for transmitting the MBS service.

In one optional implementation, the first configuration information includes a first SPS configuration list, the first SPS configuration list includes the N SPS configurations, and the first SPS configuration list is a dedicated SPS configuration list used for transmitting the MBS service.

In one optional implementation, the first configuration information includes a first SPS configuration list, the first SPS configuration list includes the N SPS configurations, and each SPS configuration of the N SPS configurations includes first indication information. The first indication information is used for indicating whether the SPS configuration is used for transmitting the MBS service and/or MBS identification information associated with the SPS configuration.

In one optional implementation, each SPS configuration of the N SPS configurations includes second indication information, and the second indication information is used for indicating MBS identification information associated with the SPS configuration.

In one optional implementation, the first configuration information is carried in a BWP configuration or a serving cell configuration.

In one optional implementation, the first configuration information is carried in an RRC signaling.

In one optional implementation, the receiving unit 601 is further configured to: receive a first DCI sent by the network device, where the first DCI is used for activating at least one SPS configuration of the N SPS configurations.

In one optional implementation, the at least one SPS configuration to be activated is determined based on a first SPS identification list or based on at least a first MBS identification,
where the first SPS identification list or the at least first MBS identification is carried in the first DCI, or in a MAC CE, or in an RRC signaling.

In one optional implementation, the first DCI is scrambled by a first CS-RNTI configured by an RRC signaling.

In one optional implementation, third indication information is carried in the first DCI, and the third indication information is used for indicating at least one of the following:
whether the activated SPS configuration is used for transmitting the MBS service; or
MBS identification information associated with the activated SPS configuration.

In one optional implementation, the first DCI is scrambled by a second CS-RNTI configured by an RRC signaling, and the second CS-RNTI is a CS-RNTI used by MBS SPS.

In one optional implementation, the second CS-RNTI is used for indicating that the activated SPS configuration is used for transmitting the MBS service, and the second CS-RNTI is associated with MBS identification information.

In one optional implementation, fourth indication information is carried in the first DCI, and the fourth indication information is used for indicating MBS identification information associated with the activated SPS configuration.

In one optional implementation, the receiving unit 601 is further configured to: receive second configuration information sent by the network device, where the second configuration information is used for determining a configuration of a first PUCCH resource pool, and a PUCCH resource in the first PUCCH resource pool is used for transmitting feedback information of the MBS service; and/or, receive third configuration information sent by the network device, where the third configuration information is used for determining a PUCCH resource of the terminal device, and the PUCCH resource is used for feedback information of the MBS service transmitted by the terminal device.

In one optional implementation, the PUCCH resource is associated with one or more SPS configurations.

In one optional implementation, the PUCCH resource is associated with MBS identification information.

In one optional implementation, the first DCI is used for activating one SPS configuration, and the one SPS configuration is used for transmitting a first MBS service.

In one optional implementation, the one SPS configuration is associated with MBS identification information of the first MBS service.

In one optional implementation, the one SPS configuration is associated with fifth indication information, and the fifth indication information is used for indicating at least one of the following:
the frequency hopping mode adopted by the first MBS service;
the frequency hopping pattern adopted by the first MBS service;
the repeated transmission mode adopted by the first MBS service;
the number of transmission times of one service data in the first MBS service;
the number of PDSCH resource allocations associated with the one SPS configuration; or
the number of repeated transmissions associated with the one SPS configuration.

In one optional implementation, the first DCI is used for activating a plurality of SPS configurations, and the plurality of SPS configurations are used for transmitting a first MBS service.

In one optional implementation, the plurality of SPS configurations are associated with MBS identification information of the first MBS service.

In one optional implementation, the plurality of SPS configurations are associated with a same HARQ feedback codebook.

In one optional implementation, the association relationship between the plurality of SPS configurations and the HARQ feedback codebook is configured by an RRC signaling, and a PUCCH resource corresponding to the HARQ feedback codebook is also configured by the RRC signaling.

In one optional implementation, the plurality of SPS configurations or each SPS configuration of the plurality of SPS configurations is associated with sixth indication information, and the sixth indication information is used for indicating at least one of the following:
the frequency hopping mode adopted by the first MBS service;
the frequency hopping pattern adopted by the first MBS service;
the number of PDSCH resource allocations associated with the SPS configuration;
the number of repeated transmissions associated with the SPS configuration; or
whether a transmission associated with the SPS configuration is an initial transmission or an M-th retransmission of one service data, where M is a positive integer.

In one optional implementation, the first DCI includes first resource allocation information, and the first resource allocation information is used for determining one or more PDSCH resource allocations corresponding to the one SPS configuration.

In one optional implementation, the first DCI includes second resource allocation information, and the second resource allocation information is used for determining one or more PDSCH resource allocations corresponding to each SPS configuration of the plurality of SPS configurations.

In one optional implementation, the first DCI includes a frequency hopping mode of MBS transmission and/or a frequency hopping pattern of MBS transmission.

The frequency hopping mode of MBS transmission includes frequency hopping transmission for retransmissions of a same service data, and frequency hopping transmission for different service data.

The frequency hopping pattern of MBS transmission is a frequency hopping pattern represented in accordance with an SPS configuration index list, or indexes associated with each radio resource allocation in the first DCI are frequency-hopped in an ascending or descending order.

In one optional implementation, a scrambling mode of a PDSCH scheduled by the first DCI is configured by an RRC signaling or indicated by the first DCI.

In one optional implementation, the PDSCH scheduled by the first DCI is scrambled using CS-RNTI; or
the PDSCH scheduled by the first DCI is scrambled using G-RNTI.

In one optional implementation, the MBS identification information includes at least one of the following: a TMGI, a G-RNTI, or an SPS G-RNTI.

Those skilled in the art should understand that the relevant description of the above-mentioned semi-persistent scheduling apparatus for the MBS service in embodiments of the present disclosure may be understood by referring to the relevant description of the semi-persistent scheduling method for the MBS service in embodiments of the present disclosure.

Figure 7:
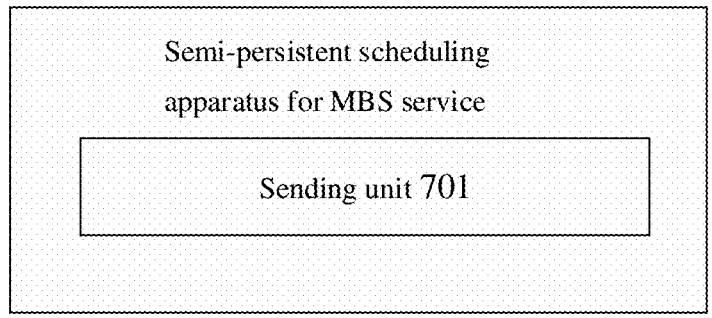
FIG. 7 is a second schematic diagram in structure and composition of the semi-persistent scheduling apparatus for the MBS service provided by embodiments of the present disclosure.

FIG. 7 is a second schematic diagram in structure and composition of the semi-persistent scheduling apparatus for the MBS service provided by embodiments of the present disclosure, which is applied to a network device. As shown in FIG. 7, the semi-persistent scheduling apparatus for the MBS service includes:

a sending unit 701, configured to send first configuration information to a terminal device, where the first configuration information is used for determining N SPS configurations, N is a positive integer, and some or all of the N SPS configurations is used for transmitting the MBS service.

In one optional implementation, the first configuration information includes a first SPS configuration list, the first SPS configuration list includes the N SPS configurations, and the first SPS configuration list is a dedicated SPS configuration list used for transmitting the MBS service.

In one optional implementation, the first configuration information includes a first SPS configuration list, the first SPS configuration list includes the N SPS configurations, and each SPS configuration of the N SPS configurations includes first indication information, where the first indication information is used for indicating whether the SPS configuration is used for transmitting the MBS service and/or MBS identification information associated with the SPS configuration.

In one optional implementation, each SPS configuration of the N SPS configurations includes second indication information, and the second indication information is used for indicating MBS identification information associated with the SPS configuration.

In one optional implementation, the first configuration information is carried in a BWP configuration or a serving cell configuration.

In one optional implementation, the first configuration information is carried in an RRC signaling.

In one optional implementation, the sending unit is further configured to: send a first DCI to the terminal device, where the first DCI is used for activating at least one SPS configuration of the N SPS configurations.

In one optional implementation, the at least one SPS configuration to be activated is determined based on a first SPS identification list or based on at least a first MBS identification.

The first SPS identification list or the at least first MBS identification is carried in the first DCI, or in a MAC CE, or in an RRC signaling.

In one optional implementation, the first DCI is scrambled by a first CS-RNTI configured by an RRC signaling.

In one optional implementation, third indication information is carried in the first DCI, and the third indication information is used for indicating at least one of the following:
  whether the activated SPS configuration is used for transmitting the MBS service; and
  MBS identification information associated with the activated SPS configuration.

In one optional implementation, the first DCI is scrambled by a second CS-RNTI configured by an RRC signaling, and the second CS-RNTI is a CS-RNTI used by MBS SPS.

In one optional implementation, the second CS-RNTI is used for indicating that the activated SPS configuration is used for transmitting the MBS service, and the second CS-RNTI is associated with MBS identification information.

In one optional implementation, fourth indication information is carried in the first DCI, and the fourth indication information is used for indicating MBS identification information associated with the activated SPS configuration.

In one optional implementation, the sending unit 701 is further configured to: send second configuration information to the terminal device, where the second configuration information is used for determining a configuration of a first PUCCH resource pool, and a PUCCH resource in the first PUCCH resource pool is used for transmitting feedback information of the MBS service; and/or, send third configuration information to the terminal device, where the third configuration information is used for determining a PUCCH resource of the terminal device, and the PUCCH resource is used for feedback information of the MBS service transmitted by the terminal device.

In one optional implementation, the PUCCH resource is associated with one or more SPS configurations.

In one optional implementation, the PUCCH resource is associated with MBS identification information.

In one optional implementation, the first DCI is used for activating one SPS configuration, and the one SPS configuration is used for transmitting a first MBS service.

In one optional implementation, the one SPS configuration is associated with MBS identification information of the first MBS service.

In one optional implementation, the one SPS configuration is associated with fifth indication information, and the fifth indication information is used for indicating at least one of the following:
  the frequency hopping mode adopted by the first MBS service;
  the frequency hopping pattern adopted by the first MBS service;
  the repeated transmission mode adopted by the first MBS service;
  the number of transmission times of one service data in the first MBS service;
  the number of PDSCH resource allocations associated with the one SPS configuration; or the number of repeated transmissions associated with the one SPS configuration.

In one optional implementation, the first DCI is used for activating a plurality of SPS configurations, and the plurality of SPS configurations are used for transmitting a first MBS service.

In one optional implementation, the plurality of SPS configurations are associated with MBS identification information of the first MBS service.

In one optional implementation, the plurality of SPS configurations are associated with a same HARQ feedback codebook.

In one optional implementation, the association relationship between the plurality of SPS configurations and the HARQ feedback codebook is configured by an RRC signaling, and a PUCCH resource corresponding to the HARQ feedback codebook is also configured by the RRC signaling.

In one optional implementation, the plurality of SPS configurations or each SPS configuration of the plurality of SPS configurations is associated with sixth indication information, and the sixth indication information is used for indicating at least one of the following:
the frequency hopping mode adopted by the first MBS service;
the frequency hopping pattern adopted by the first MBS service;
the number of PDSCH resource allocations associated with the SPS configuration;
the number of repeated transmissions associated with the SPS configuration; or
whether a transmission associated with the SPS configuration is an initial transmission or an M-th retransmission of one service data, where M is a positive integer.

In one optional implementation, the first DCI includes first resource allocation information, and the first resource allocation information is used for determining one or more PDSCH resource allocations corresponding to the one SPS configuration.

In one optional implementation, the first DCI includes second resource allocation information, and the second resource allocation information is used for determining one or more PDSCH resource allocations corresponding to each SPS configuration of the plurality of SPS configurations.

In one optional implementation, the first DCI includes a frequency hopping mode of MBS transmission and/or a frequency hopping pattern of MBS transmission.

The frequency hopping mode of MBS transmission includes a frequency hopping transmission for retransmissions of a same service data, and a frequency hopping transmission for different service data.

The frequency hopping pattern of MBS transmission is a frequency hopping pattern represented in accordance with an SPS configuration index list, or indexes associated with each radio resource allocation in the first DCI are frequency-hopped in an ascending or descending order.

In one optional implementation, a scrambling mode of a PDSCH scheduled by the first DCI is configured by an RRC signaling or indicated by the first DCI.

In one optional implementation, the PDSCH scheduled by the first DCI is scrambled using CS-RNTI; or the PDSCH scheduled by the first DCI is scrambled using G-RNTI.

In one optional implementation, the MBS identification information includes at least one of the following: a TMGI, a G-RNTI, or an SPS G-RNTI.

Those skilled in the art should understand that the relevant description of the above-mentioned semi-persistent scheduling apparatus for the MBS service in embodiments of the present disclosure may be understood by referring to the relevant description of the semi-persistent scheduling method for the MBS service in embodiments of the present disclosure.

Figure 8:
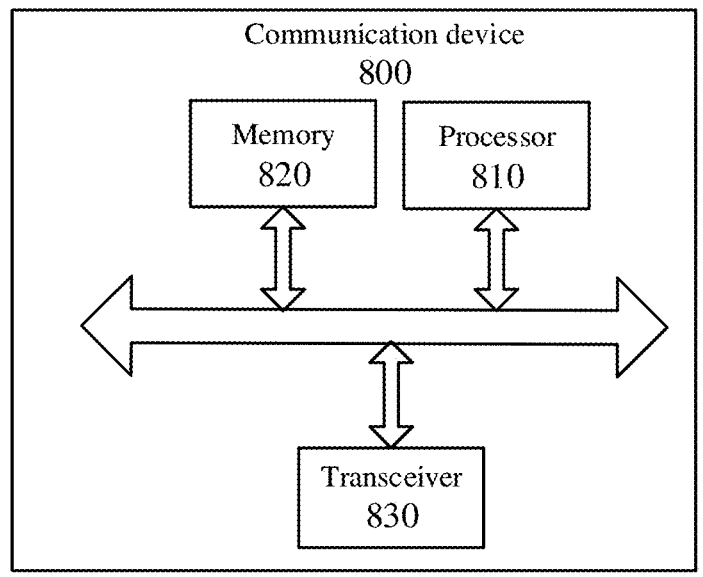
FIG. 8 is a schematic structural diagram of a communication device provided by embodiments of the present disclosure.

FIG. 8 is a schematic structural diagram of a communication device 800 provided by embodiments of the present disclosure. The communication device may be a terminal device or a network device. The communication device 800 shown in FIG. 8 includes a processor 810, and the processor 810 may call and run a computer program from a memory, so as to implement the method in embodiments of the present disclosure.

Optionally, as shown in FIG. 8, the communication device 800 may further include a memory 820. The processor 810 may call and run a computer program from the memory 820, so as to implement the method in embodiments of the present disclosure.

The memory 820 may be a separate device independent of the processor 810, or it may be integrated into the processor 810.

Optionally, as shown in FIG. 8, the communication device 800 may further include a transceiver 830, and the processor 810 may control the transceiver 830 to communicate with other device(s). Specifically, the transceiver 830 may send information or data to other device(s), or receive information or data from other device(s).

The transceiver 830 may include a transmitter and a receiver. The transceiver 830 may further include an antenna, and there may be one or more antennas.

Optionally, the communication device 800 may be the network device in embodiments of the present disclosure, and the communication device 800 may implement the corresponding processes implemented by the network device in each method according to embodiments of the present disclosure, which will not be repeated here for the sake of brevity.

Optionally, the communication device 800 may be the mobile terminal/terminal device in embodiments of the present disclosure, and the communication device 800 may implement the corresponding processes implemented by the mobile terminal/terminal device in each method according to embodiments of the present disclosure, which will not be repeated here for the sake of brevity.

Figure 9:
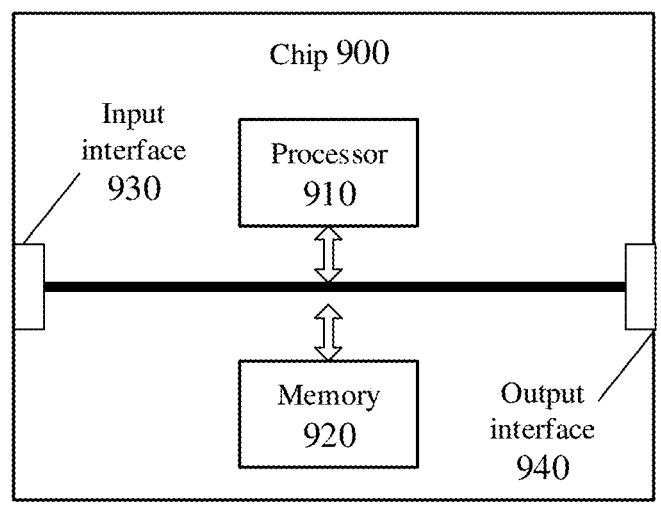
FIG. 9 is a schematic structural diagram of a chip according to embodiments of the present disclosure.

FIG. 9 is a schematic structural diagram of a chip according to embodiments of the present disclosure. The chip 900 shown in FIG. 9 includes a processor 910, and the processor 910 may call and run a computer program from a memory, so as to implement the methods in embodiments of the present disclosure.

Optionally, as shown in FIG. 9, the chip 900 may further include a memory 910. The processor 910 may call and run a computer program from the memory 920, so as to implement the methods in embodiments of the present disclosure.

The memory 920 may be a separate device independent of the processor 910, or it may be integrated into the processor 910.

Optionally, the chip 900 may further include an input interface 930. The processor 910 may control the input interface 930 to communicate with other devices or chips. Specifically, the processor 910 may acquire information or data sent by other devices or chips.

Optionally, the chip 900 may further include an output interface 940. The processor 910 may control the output interface 940 to communicate with other devices or chips. Specifically, the processor 910 may output information or data sent by other devices or chips.

Optionally, the chip may be applied to the network device in embodiments of the present disclosure, and the chip may implement the corresponding processes implemented by the network device in the methods according to embodiments of the present disclosure. For the sake of brevity, details are not repeated here.

Optionally, the chip may be applied to the mobile terminal/terminal device in embodiments of the present disclosure, and the chip may implement the corresponding processes implemented by the terminal device/terminal device in the methods according to embodiments of the present disclosure. For the sake of brevity, details are not repeated here.

It should be understood that the chip mentioned in embodiments of the present disclosure may also be referred to as a system on chip, a system chip, a chip system, or a System-on-Chip.

Figure 10:
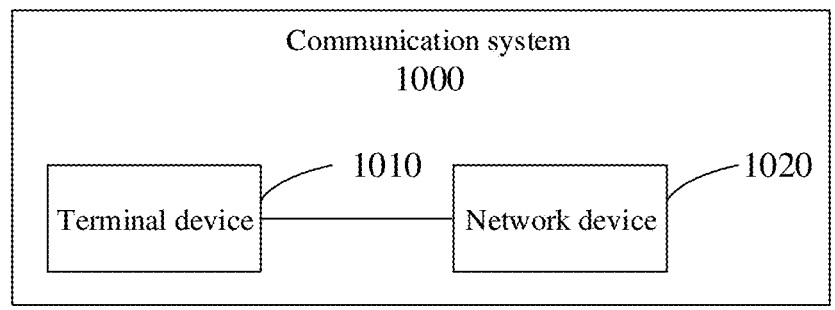
FIG. 10 is a schematic block diagram of a communication system provided by embodiments of the present disclosure.

FIG. 10 is a schematic block diagram of a communication system provided by embodiments of the present disclosure. As shown in FIG. 10, the communication system 1000 includes a terminal device 1010 and a network device 1020.

The terminal device 1010 may be used for implementing the corresponding functions implemented by the terminal device in the above method, and the network device 1020 may be used for implementing the corresponding functions implemented by the network device in the above method. For brevity, details are not repeated here.

It should be understood that the processor in embodiments of the present disclosure may be an integrated circuit chip with the capability of signal processing. In the implementation process, each step of the above method embodiments may be completed by a hardware integrated logic circuit in the processor or an instruction in the form of software. The above-mentioned processor may be a general-purpose processor, a Digital Signal Processor (DSP), an Application Specific Integrated Circuit (ASIC), a Field Programmable Gate Array (FPGA), or other programmable logic devices, discrete gate or transistor logic devices, discrete hardware components. The methods, steps, and logic block diagrams disclosed in embodiments of the disclosure may be implemented or executed. The general-purpose processor may be a microprocessor, or the processor may be any conventional processor or the like. The steps of the method disclosed in reference to embodiments of the present disclosure may be directly embodied as being performed by a hardware decoding processor, or performed by a combination of hardware in the decoding processor and software modules. The software modules may be located in random access memory, flash memory, read-only memory, programmable read-only memory, or electrically erasable programmable memory, registers, and other mature storage medium in the art. The storage medium is located in the memory. The processor reads the information from the memory, and completes the steps of the above method in conjunction with the hardware thereof.

It can be understood that the memories in embodiments of the present disclosure may be volatile memories or nonvolatile memories, or may include both the volatile and non-volatile memories. The non-volatile memory may be a Read-Only Memory (ROM), a Programmable ROM (PROM), an Erasable PROM (EPROM), an Electrically EPROM (EEPROM) or a flash memory. The volatile memory may be a Random Access Memory (RAM), which is used as an external cache. By way of illustration but not limitation, many forms of RAM are available, for example, a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), and a Direct Rambus RAM (DR RAM). It should be noted that the memory of the systems and methods described herein is intended to include, but not be limited to, these and any other suitable types of memory.

It should be understood that the above-mentioned memories are illustrative but not restrictive. For example, the memory in embodiments of the present disclosure may also be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM), and a Direct Rambus RAM (DR RAM), etc. That is, the memory in embodiments of the present disclosure is intended to include, but not be limited to, these and any other suitable types of memory.

Embodiments of the present disclosure further provide a computer-readable storage medium, configured to store a computer program.

Optionally, the computer-readable storage medium may be applied to the network device in embodiments of the present disclosure, and the computer program may cause a computer to perform the corresponding processes implemented by the network device in the methods according to embodiments of the present disclosure. For the sake of brevity, details are not repeated here.

Optionally, the computer-readable storage medium may be applied to the mobile terminal/terminal device in embodiments of the present disclosure, and the computer program may cause a computer to perform the corresponding processes implemented by the mobile terminal/terminal device in the methods according to embodiments of the present disclosure. For the sake of brevity, details are not repeated here.

Embodiments of the present disclosure further provide a computer program product, including computer program instructions.

Optionally, the computer program product may be applied to the network device in embodiments of the present disclosure, and the computer program instructions may cause a computer to perform the corresponding processes implemented by the network device in the methods according to embodiments of the present disclosure. For the sake of brevity, details are not repeated here.

Optionally, the computer program product may be applied to the mobile terminal/terminal device in embodiments of the present disclosure, and the computer program instructions may cause a computer to perform the corresponding processes implemented by the mobile terminal/terminal device in the methods according to embodiments of the present disclosure. For the sake of brevity, details are not repeated here.

Embodiments of the present disclosure further provide a computer program.

Optionally, the computer program may be applied to the network device in embodiments of the present disclosure. When the computer program is run on a computer, the computer program may cause the computer to perform the corresponding processes implemented by the network device in the methods according to embodiments of the present disclosure. For the sake of brevity, details are not repeated here.

Optionally, the computer program may be applied to the mobile terminal/terminal device in embodiments of the present disclosure. When the computer program is run on a computer, the computer program may cause the computer to perform the corresponding processes implemented by the mobile terminal/terminal device in the methods according to embodiments of the present disclosure. For the sake of brevity, details are not repeated here.

Those of ordinary skills in the art may realize that the units and algorithm steps of each example described with reference to embodiments disclosed herein may be implemented through electronic hardware, or a combination of computer software and electronic hardware. Whether these functions are performed in the form of hardware or software depends on the specific application and design constraints of the technical solution. Those skilled in the art may use different methods to implement the described functions for each specific application, but such implementation should not be regarded as departing from the scope of the present disclosure.

Those skilled in the art may clearly understand that for the convenience and brevity of the description, the specific working processes of the above-described systems, apparatuses and units may refer to the corresponding processes in the foregoing method embodiments, which will not be repeated here.

In the several embodiments provided by present disclosure, it should be understood that the disclosed systems, apparatuses and methods may be implemented in other ways. For example, the apparatus embodiments described above are only illustrative. For example, the division of the units is only a logical function division. In actual implementations, other divisions may be available. For example, multiple units or components may be combined or integrated into another system, or some features may be ignored or not implemented. Further, the mutual coupling or direct coupling or communication connection shown or discussed herein may be an indirect coupling or communication connection through some interfaces, apparatuses or units, which may be in electrical, mechanical or other forms.

The units described as separate components may or may not be physically separated, and the components displayed as units may or may not be physical units. That is, they may be located at one place, or may be distributed to multiple network units. Some or all of the units may be selected according to actual needs to achieve the purpose of the technical solution of the present embodiment.

In addition, each functional unit in each embodiment of the present disclosure may be integrated into one processing unit, or each unit may exist separately as individual physical unit, or two or more units may be integrated into one unit.

If the functions described above are realized in the form of software function units and sold or used as independent products, they may be stored in a computer-readable storage medium. Based on this understanding, the technical solution of the present disclosure or the part that contributes to the prior art, may be essentially embodied in the form of software products. The computer software product is stored in a storage medium, which includes multiple instructions to enable a computer device (such as a personal computer, a server, or a network device) to perform all or some of the steps of the method described in embodiments of the present disclosure. The aforementioned storage medium includes various medium that can store program code, such as USB flash drives, external hard drives, Read-Only Memory (ROM), Random Access Memory (RAM), disks, or optical discs.

The above descriptions are only the specific implementations of the present disclosure, and the protection scope of the present disclosure is not limited thereto. Any variations or substitutions that can be easily conceived by those skilled in the art within the technical scope disclosed in the present disclosure shall be covered by the protection scope of the present disclosure. Therefore, the scope of protection of the present disclosure shall be subject to the protection scope of the claims.

What is claimed is:

1. A method of wireless communication of a terminal device, comprising:
   receiving, by the terminal device, first configuration information sent by a network device, the first configuration information being used for determining N semi-persistent scheduling (SPS) configurations, N being a positive integer, and some or all of the N SPS configurations being used for transmitting a multicast broadcast service (MBS) service by the network device, the first configuration information comprising a first SPS configuration list, the first SPS configuration list comprising the N SPS configurations, and the first SPS configuration list being a dedicated SPS configuration list used for transmitting the MBS service; and
   receiving, by the terminal device, second configuration information sent by the network device, the second configuration information being used for determining a configuration of a first physical uplink control channel (PUCCH) resource pool, and a PUCCH resource in the first PUCCH resource pool being used for transmitting feedback information of the MBS service; or
   receiving, by the terminal device, third configuration information sent by the network device, the third configuration information being used for determining a PUCCH resource of the terminal device, and the PUCCH resource being used for feedback information of the MBS service transmitted b the terminal device.

2. The method of claim 1, wherein the first configuration information is carried in a bandwidth part (BWP) configuration or a serving cell configuration.

3. The method of claim 1, wherein the first configuration information is carried in a radio resource control (RRC) signaling.

4. The method of claim 1, wherein the PUCCH resource is associated with one or more SPS configurations.

5. The method of claim 1, wherein the PUCCH resource is associated with MBS identification information.

6. A method of wireless communication of a network device, comprising:
   sending, by the network device, first configuration information to a terminal device, the first configuration information being used for determining N semi-persistent scheduling (SPS) configurations, N being a positive integer, and some or all of the N SPS configurations being used for transmitting a multicast broadcast service (MBS) service by the network device, the first configuration information comprising a first SPS configuration list, the first SPS configuration list comprising the N SPS configurations, and the first SPS configuration list being a dedicated SPS configuration list used for transmitting the MBS service; and
   sending, by the network device, second configuration information to the terminal device,—the second configuration information being used for determining a configuration of a first physical uplink control channel (PUCCH) resource pool, and a PUCCH resource in the first PUCCH resource pool being used for transmitting feedback information of the MBS service; or
   sending, by the network device, third configuration information to the terminal device,—the third configuration information being used for determining a PUCCIH resource for the terminal device, and the PUCCH resource being used for feedback information of the NIBS service transmitted by the terminal device.

7. The method of claim 6, wherein the first configuration information is carried in a bandwidth part (BWP) configuration or a serving cell configuration.

8. The method of claim 6, wherein the first configuration information is carried in radio resource control (RRC) signaling.

9. The method of claim 6, wherein the PUCCH resource is associated with one or more SPS configurations.

10. A terminal device, comprising:
a processor; and
memory storing instructions, which when executed by the processor, cause the processor to:
receive first configuration information sent by a network device, the first configuration information being used for determining N semi-persistent scheduling (SPS) configurations, N being a positive integer, and some or all of the N SPS configurations being used for transmitting a multicast broadcast service (MBS) service by the network device, the first configuration information comprising a first SPS configuration list, the first SPS configuration list comprising the N SPS configurations, and the first SPS configuration list being a dedicated SPS configuration list used for transmitting the MBS service; and
receive second configuration information sent by the network device, the second configuration information being used for determining a configuration of a first physical uplink control channel (PUCCH) resource pool, and a PUCCH resource in the first PUCCH resource pool being used for transmitting feedback information of the MBS service; or
receive third configuration information sent by the network device, the third configuration information being used for determining a PUCCH resource of the terminal device, and the PUCCH resource being used for feedback information of the MBS service transmitted by the terminal device.

11. The terminal device of claim 10, wherein the first configuration information is carried in a bandwidth part (BWP) configuration or a serving cell configuration.

12. The terminal device of claim 10, wherein the first configuration information is carried in a radio resource control (RRC) signaling.

13. The terminal device of claim 10, wherein the PUCCH resource is associated with one or more SPS configurations.

14. A network device, comprising:
a processor; and
memory storing instructions, which when executed by the processor, cause the processor to:
send first configuration information to a terminal device, the first configuration information being used for determining N semi-persistent scheduling (SPS) configurations, N being a positive integer, and some or all of the N SPS configurations being used for transmitting a multicast broadcast service (MBS) service by the network device, the first configuration information comprising a first SPS configuration list, the first SPS configuration list comprising the N SPS configurations, and the first SPS configuration list being a dedicated SPS configuration list used for transmitting the MBS service; and
send second configuration information to the terminal device,—the second configuration information being used for determining a configuration of a first physical uplink control channel (PUCCH) resource pool, and a PUCCH resource in the first PUCCH resource pool being used for transmitting feedback information of the MBS service, or
send third configuration information to the terminal device,—the third configuration information being used for determining a PUCCH resource for the terminal device, and the PUCCH resource being used for feedback information of the NIBS service transmitted by the terminal device.

* * * * *